United States Patent [19]

Baumert

[11] Patent Number: 5,467,351

[45] Date of Patent: Nov. 14, 1995

[54] EXTENDIBLE ROUND ROBIN LOCAL AREA HUB NETWORK

[75] Inventor: Robert J. Baumert, Allentown, Pa.

[73] Assignee: AT&T Corp., Murray Hill, N.J.

[21] Appl. No.: 231,419

[22] Filed: Apr. 22, 1994

[51] Int. Cl.⁶ ...................................... H04J 3/02
[52] U.S. Cl. .................................. 370/85.15; 370/85.1
[58] Field of Search .......................... 370/85.5, 85.1, 370/85.15, 60, 94.1, 95.2, 85.12, 85.14, 85.8

[56] References Cited

U.S. PATENT DOCUMENTS

| | | | |
|---|---|---|---|
| 3,633,169 | 1/1972 | Bickford | 370/85.15 |
| 4,513,373 | 4/1985 | Sheets | 364/200 |
| 4,570,167 | 2/1986 | Sugitani et al. | 346/140 |
| 4,608,685 | 8/1986 | Jain et al. | 370/85 |
| 4,674,085 | 6/1987 | Aranguren et al. | 370/85 |
| 4,787,082 | 11/1988 | Delaney et al. | 370/85 |
| 4,787,083 | 11/1988 | Tanaka | 370/85.1 |
| 4,825,435 | 4/1989 | Amundsen et al. | 370/97 |
| 4,866,704 | 9/1989 | Bergman | 370/85.5 |
| 4,872,158 | 10/1989 | Richards | 370/58.1 |
| 4,982,400 | 1/1991 | Ebersole | 370/85.15 |
| 4,998,247 | 3/1991 | Irvine-Halliday et al. | 370/94.1 |
| 5,018,139 | 5/1991 | Despres | 370/94.3 |
| 5,041,963 | 8/1991 | Ebersole et al. | 364/200 |
| 5,042,031 | 8/1991 | Yokoyama et al. | 370/85.5 |
| 5,043,938 | 8/1991 | Ebersole | 364/900 |
| 5,239,673 | 8/1993 | Natarajan | 370/85.5 |
| 5,319,644 | 6/1994 | Liang | 370/85.5 |

OTHER PUBLICATIONS

Patent application Ser. No. 08/188,623, Baumert, et al., filed Jan. 28, 1994, assigned to AT&T., entitled "Method of Transmitting Signals in an Extendible Local Area Network".

Demand Priority Preliminary Draft submitted to IEEE 802.12 by Hewlett Packard, Roseville, Calif., pp. 0–1 to 12–27, Jan. 1994.

Draft Standard "Information Technology Local and Metropolitan Networks—Part 12: Demand Priority Access Method and Physical Layer Specifications," IEEE Standards Department, New York, N.Y., Mar. 1994, P802.12, pp. 1–1 to 15–10, sponsor: LAN MAN Standards Committee of the IEEE Computer Society.

*Primary Examiner*—Douglas W. Olms
*Assistant Examiner*—Shick Hom
*Attorney, Agent, or Firm*—Howard A. Skaist

[57] ABSTRACT

An extendible, round robin, local area hub station network includes: at least two round robin hub station segments coupled so as to form a ring-shaped hub station segment signal path. One of the two hub station segments includes a master hub station segment adapted to provide control signals, such as electrical or optical signals, on the ring-shaped segment signal path to transfer control of round robin polling over the hub station network between any two hub station segments in the hub station network. The hub station segments are also mutually coupled by a signal bus. Likewise, a method of round robin polling in an extendible, round robin, local area hub network includes the steps of: signaling a request for control of round robin polling over the hub station network from at least one of the at least two hub station segments in the hub station network to the master hub station segment, and transmitting a signal from the master hub station segment transferring control of round robin polling over the hub station network between any two of the at least two hub station segments.

20 Claims, 5 Drawing Sheets

SIGNAL PACKET

EXTENDIBLE ROUND ROBIN LOCAL AREA HUB NETWORK

RELATED APPLICATION

This patent application is related to U.S. patent application Ser. No. 08/188623, entitled "Method of Transmitting Signals in an Extendible Local Area Hub Network," by Robert Baumert, et al., filed Jan. 28, 1994, assigned to the assignee of the present invention and herein incorporated by reference.

TECHNICAL FIELD

This invention relates to local area networks (LANs) and, more particularly, to an extendible, round robin, local area hub network, such as may be employed, for example, in computer communications.

BACKGROUND OF THE INVENTION

Local area networks (LANs), such as are used, for example, in computer communications, are well-known and described in U.S. Pat. No. 5,041,963, entitled, "Local Area Network with an Active Star Topology Comprising Ring Controllers having Ring Monitor Logic Function," by Ebersole et al., issued Aug. 20, 1991; U.S. Pat. No. 4,998,247, entitled, "Active Star-Configured Local Area Network," by Irvine-Halliday et al., issued Mar. 5, 1991; U.S. Pat. No. 4,982,400, entitled, "Ring Bus Hub for a Star Local Area Network," by Ebersole, issued Jan. 1, 1991; U.S. Pat. No. 4,825,435, entitled, "Multiport Repeater," by Amundsen et al., issued Apr. 25, 1989; U.S. Pat. No. 4,872,158, entitled, "Distributed Control Rapid Connection Circuit Switch," by Richards, issued Oct. 3, 1989; U.S. Pat. No. 4,787,082, entitled, "Dataflow Control Arrangement for Local Area Network," by Delaney et al., issued Nov. 22, 1988; and U.S. Pat. No. 4,674,085, entitled, "Local Area Network," by Aranguren et al., issued Jun. 16, 1987; all of the foregoing being incorporated by reference.

The stations or nodes of a local area network may be configured in a variety of shapes, such as, for example, as a ring or a star. In a star-configured or local area hub network, multiple, discrete, remote stations are coupled through a central site or station, termed a hub station. The hub station must then follow a particular or predetermined signaling protocol to establish communications and to determine the order in which remote stations are permitted to transmit data over the network in the form of signals, such as electrical or optical signals. In one such signaling protocol, termed round robin, each of the remote stations is separately polled for transmissions. Likewise, in a round robin signaling protocol, only one station may transmit electrical signal data over the network at a time.

As disclosed and described in *Draft for Standard Information Technology Local and Metropolitan Networks- Part 12: Demand Priority Access Method and Physical Layer Specifications*, P802.12, dated March 1994, herein incorporated by reference, a round robin protocol has been proposed to the IEEE to be employed in local area networks transmitting data in the form of electrical signals at 100 megabits, termed 100 base VG. A round robin protocol provides advantages over other known network protocols, such as the protocol employed by IEEE standard 802.3, also known as CSMA/CD (Carrier Sense Multiple Access with Collision Detector), such as, for example, 10 base T, particularly for multimedia communications tasks that may be time sensitive. For such multimedia tasks or applications, it becomes desirable to prioritize or control access to the media or communications network provided different remote stations, such as computer peripherals, so that, in general, the more important communications tasks obtain access to the network earlier than the less important tasks.

For a local area hub network, it often becomes desirable to increase the size of the network without substantially degrading signal transmission performance; that is, it is desirable for the network to be extendible. However, as local area hub networks increase in size, the hardware for communications between remote stations of the network becomes increasingly complex. For example, technological limitations on the manufacture of integrated circuit chips typically restrict the number of ports that may be fabricated on one chip. Thus, for a large local area hub network having, for example, tens or hundreds of stations, communications between the remote stations directly linked or coupled to one hub station in the network may need to be shared among several, discrete devices or chips. The problem of performing or controlling round robin polling between these discrete devices also becomes more complex. Thus, a need exists for a method of polling remote stations for an extendible, round robin, local area hub network.

SUMMARY OF THE INVENTION

Briefly, in accordance with one embodiment of the invention, an extendible, round robin, local area hub station network comprises: at least two round robin hub station segments coupled so as to form a ring-shaped hub station segment signal path. One of the two hub station segments comprises a master hub station segment adapted to provide control signals, such as electrical or optical signals, on the ring-shaped segment signal path. The control signals transfer control of round robin polling over the hub station network between any two of the at least two hub station segments in the hub station network. The at least two hub station segments are also mutually coupled by a signal bus. Likewise, a method of round robin in an extendible, round robin, local area hub network comprises the steps of: signaling a request for control of round robin polling over the hub station network from at least one of the at least two hub station segments in the hub station network to the master hub station segment, and transmitting from the master hub station segment a signal transferring control of round robin polling over the hub station network between any two of the at least two hub station segments.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof, may best be understood by reference to the following detailed description when read with the accompanying drawings in which:

DETAILED DESCRIPTION

Figure 3:
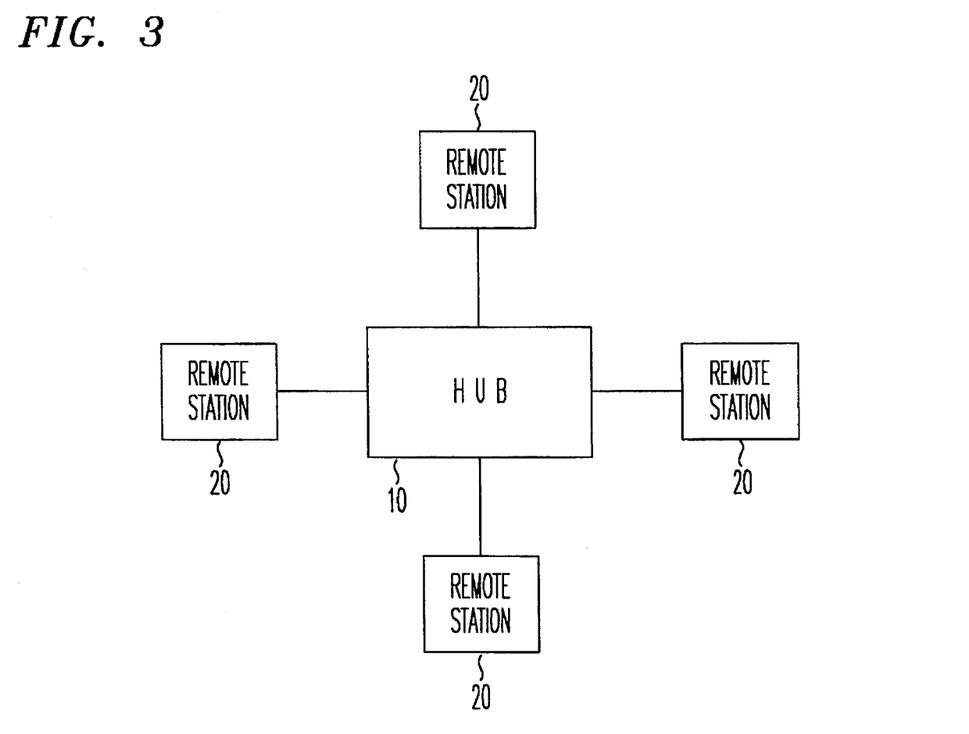
FIG. 3 is a schematic diagram of a conventional local area hub network.
Figure 4:
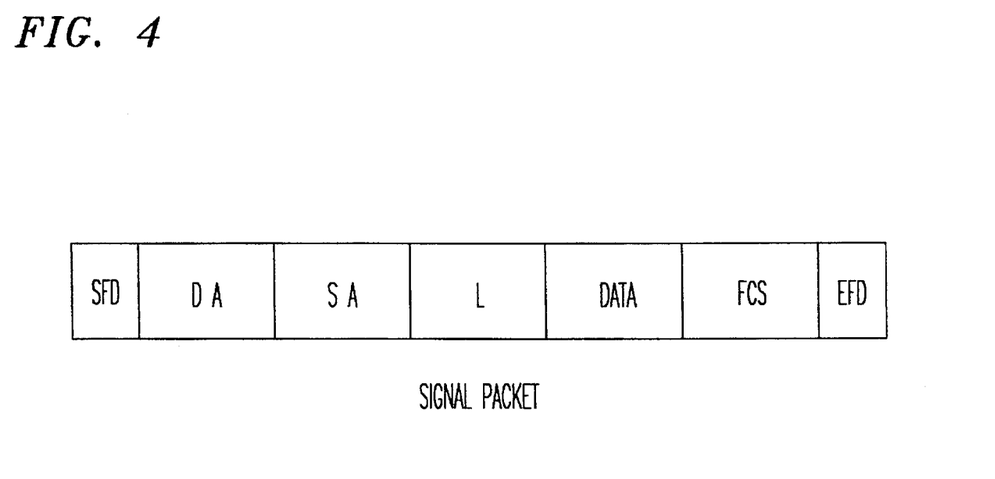
FIG. 4 is a diagram of one embodiment of an electrical signal packet that may be employed to transmit data in the form of digital signals between remote stations of an extendible, round robin, local area hub network in accordance with the invention.

FIG. 3 is a schematic diagram of one embodiment of a conventional local area star-configured or hub-shaped network. As previously suggested, in a local area hub network, the stations are arranged in a star-shaped network or in a star configuration in which a central station 10 acts as a hub for the remote or other remaining stations 20 directly coupled or linked to the central station. Thus, a hub network or hub station network may be used to transmit a signal packet, such as an electrical signal packet, from one remote station to another remote station or multiple remote stations, all remote stations being in direct communication with, or directly coupled to, the hub station. Remote stations may comprise, for example, a data terminal or other computer-related equipment, as described in the aforementioned *Demand Priority Access* document. In the context of the invention, the term signal packet or transmission refers to a complete and discrete grouping of data in the form of signals, typically digital signals, for transmission between stations. Thus, for example, a signal packet may comprise digital signals to be transmitted that are stored in a computer file at a remote station. Typically, such packets or transmissions may include a start of frame delimiter (SFD), and an end of frame delimiter (EFD). Likewise, as described on page 4–3 of the aforesaid *Demand Priority Access* document, and as illustrated in FIG. 4, a packet may further include binary digital signals or bits representing, for example, a destination address (DA), a source address (SA), the length of the packet (L), the data to be transmitted (DATA), and a frame check sequence (FCS) for signal error checking. It will be appreciated that the invention is not restricted in scope to employing the embodiment of a signal packet illustrated in FIG. 4.

In the network illustrated in FIG. 3, signal packets, such as electrical signal packets, that are being transmitted between two remote stations must pass through hub station 10. Depending on the particular network, hub stations typically have the capability to perform and recognize a signaling protocol (often termed "handshaking"), the capability to identify and extract data from an electrical signal packet, the capability to store data in the form of electrical signals, the capability to perform signal error checking, and the capability to perform destination address matching, such as described in the aforementioned *Demand Priority Access* document.

One desirable aspect of a local area hub network includes the capability to expand the network. However, due to the limitations of integrated circuit technology, a single integrated circuit (IC) chip may accommodate only a few remote stations due to the relatively small number of ports that may be fabricated on a single IC chip. One approach to this problem may encompass adding additional hub chips, or hub station segments, that are coupled with the initial or first hub station segment to form a hub station or hub station network. In the context of the invention, the term "hub station segment" refers to a discrete device, such as an integrated circuit chip or other such component, that is a subdivision of a hub station and may be interconnected with other such devices or hub station segments to form a hub station. For such a hub station or hub station network, the hub station segments should be coupled and signals must be communicated between the segments so that the performance of the round robin signaling protocol is not substantially degraded. Furthermore, it is desirable to not increase the complexity of the hardware unduly and to exhibit low pin or port overhead by reducing the number or maintaining a relatively low number of ports needed to accomplish satisfactory operation.

Figure 1:
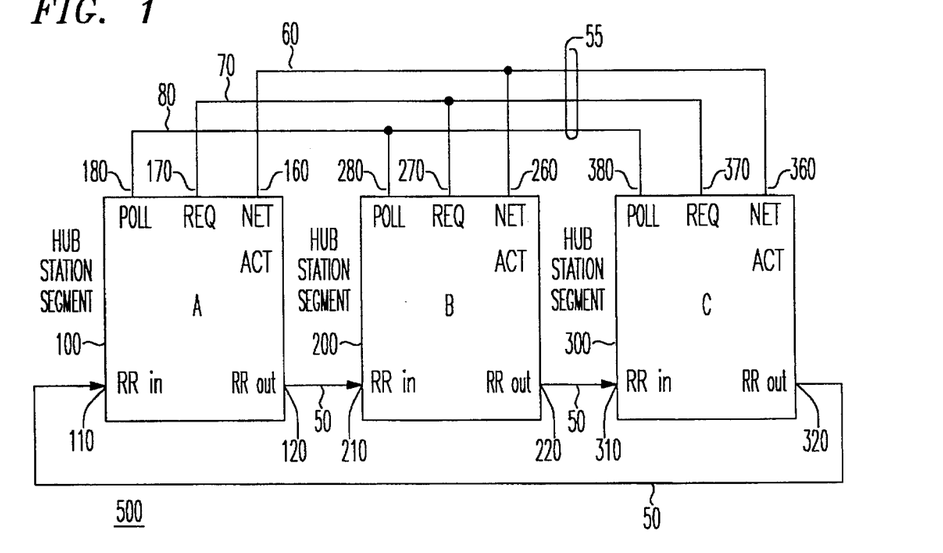
FIG. 1 is a schematic diagram of a portion of an embodiment of a hub station network for an extendible, round robin, local area hub network in accordance with the invention.

A portion of one embodiment of a hub station or hub station network 500 for an extendible, round robin, local area hub network in accordance with the invention is illustrated in FIG. 1. As illustrated, the hub station includes at least three round robin hub station segments, segment 100 ("A"), segment 200 ("B"), and segment 300 ("C"), respectively, coupled so as to form a ring-shaped hub station segment signal path, illustrated by signal path 50 in FIG. 1. Nonetheless, the hub station may include fewer hub station segments or more hub station segments depending upon the particular application or embodiment. In the context of the invention, the term "ring-shaped signal path" or "ring-shaped hub station segment signal path" refers to any closed loop signal path regardless of physical layout or topology, such as might arise, for example, from a signal path between different floors in a building. One of the hub station segments, hub station segment 100 in the embodiment illustrated in FIG. 1, comprises a master hub station segment being adapted to monitor requests for control of round robin polling over the hub station network from the hub station segments in the ring-shaped segment signal path. In this context, for a hub station segment, control of round robin polling over the hub station network or control of the hub station network refers to a hub station segment having exclusive use of the hub station network to perform round robin polling of the remote stations directly coupled to that hub station segment. Exclusive use of the hub station network is provided because in a round robin signaling protocol only one remote station may transmit a signal packet at a time. Thus, as described in the aforementioned patent application "Method of Transmitting Electrical Signals in an Extendible Local Area Hub Network," this-round robin polling may also include transmitting signals or signal packets, such as electrical signal packets, over the hub station network. Hub station segment 100 is further adapted to provide control signals, such as electrical signals or optical signals, on the ring-shaped segment signal path which transfer control of polling between hub station segments in the ting-shaped segment signal path, such as between hub station segment 100 and hub station segment 200 or between hub station segment 100 and hub station segment 300. Then, each hub station segment polls only those remote stations, termed local remote stations in this context, directly coupled to or in direct communication with the particular segment.

For the embodiment illustrated in FIG. 1, hub station segment 100 is the master hub station segment. However, the invention is not restricted in scope in this manner. Therefore, any one of the hub station segments in the ting-shaped segment signal path may be configured as the master hub station segment. In this particular embodiment, therefore, the other hub station segments operate as slave hub station segments by default. Likewise, all of the hub station segments in the hub station network include a round robin controller or a state machine. The round robin controller may, for example, typically be accomplished through a programmable IC or through digital circuitry internal to the hub station segments having states corresponding to the state diagrams illustrated in FIGS. 6 and 7, explained in more detail hereinafter. The round robin controller or state machine may also incorporate information regarding the hub station network, such as the number of hub station segments in the ring-shaped segment signal path and, likewise, the location of each hub station segment along the path. Where the IC is programmable, this information may be handled through micro-programming such as by a preliminary hub station network "set-up" routine.

As illustrated in FIG. 1, the hub station segments in the hub station network are coupled so as to form a ring-shaped hub station segment signal path. This ring-shaped segment signal path, designated 50 in FIG. 1, couples port 120 on hub station segment 100 to port 210 on hub station segment 200. Likewise, port 220 is coupled to port 310, and port 320 is coupled to port 110. Digital signals travel along or around the ring-shaped segment signal path in one direction, either clockwise or counter-clockwise depending on the particular embodiment, in response to an externally-derived clock pulse or timing signal. Typically, a single external clock is coupled to each segment, although the invention is not restricted in scope in this respect. For example, alternatively several, mutually synchronized clocks may coordinate the timing of the segments of the hub station network. As will be explained in more detail hereinafter, the digital signals are employed to transfer control of round robin polling over the hub station network among hub station segments in response to a request by at least one of the hub station segments in the ring-shaped segment signal path to the master hub station segment.

As illustrated in FIG. 1, the hub station segments are mutually coupled by a signal bus, designated bus 55, comprising in this particular embodiment three couplings or connections. For the sake of convenience, coupling 70 is designated "request," coupling 80 is designated "poll," and coupling 60 is designated "network active." For the embodiment illustrated in FIG. 1, request line or coupling 70 may couple open drain output ports of the slave hub station segments with an external "pullup" to an input port of the master hub station segment. Likewise, poll line or coupling 80 may couple an output port of the master hub station segment to the input ports of the slave hub station segments in this manner and network active coupling 60 likewise couples open drain output ports of the slave hub station segments to an input port of the master hub station segment 100.

As illustrated in FIG. 1, coupling 70 of bus 55 mutually couples port 170 of hub station segment 100 with port 270 of hub station segment 200. Likewise, coupling 70 mutually couples port 270 of hub station segment 200 with port 370 of hub station segment 300. Coupling 70 is adapted to provide a request signal from any hub station segment, or any other hub station segment, coupled along the ring-shaped segment signal path to master hub station segment 100.

Likewise, coupling 80 of bus 55 mutually couples port 180 of hub station segment 100, port 280 of hub station segment 200, and port 380 of hub station segment 300. Coupling 80 is adapted to provide a polling signal from master hub station segment 100 to any hub station segment, or any other hub station segment, in the ring-shaped segment signal path. It will be appreciated that this polling signal from the master hub station segment is distinguished from the round robin polling of directly coupled, local remote stations that may be conducted by a hub station segment. It will now be appreciated that depending on the particular embodiment, master hub station segment 100 may provide a request signal over bus 55 and may provide a polling signal to all hub station segments including the master hub station segment. However, typically, the master hub station segment will handle this signaling through internal circuitry rather than signal bus 55. Likewise, coupling 60 of the signal bus mutually couples port 160, port 260, and port 360. Coupling 60 is adapted to provide a network active signal from the hub station segment having control of round robin polling over the hub station network at a given time or during a particular period, as explained in more detail hereinafter.

Figure 5:
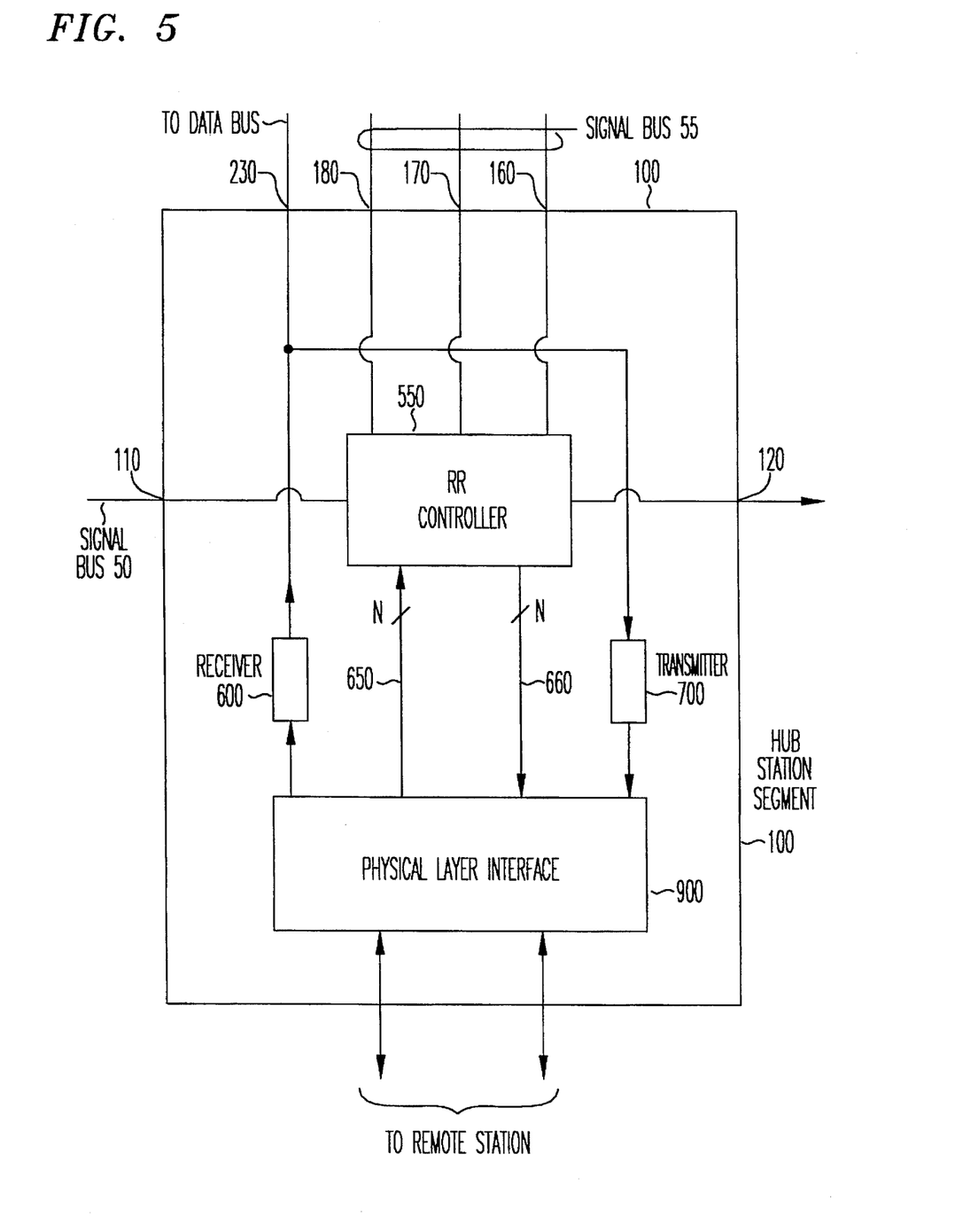
FIG. 5 is a schematic diagram of an embodiment of a hub station segment for an extendible, round robin, local area hub network in accordance with the invention.

FIG. 5 illustrates the embodiment of hub station segment 100 in greater detail. Nonetheless, it will be appreciated that the invention is not restricted in scope to this particular embodiment and other alternative embodiments are possible. Likewise, the embodiment illustrated in FIG. 5 may be implemented in conjunction with the embodiment of a hub station segment illustrated in FIG. 2 of aforementioned U.S. patent application Ser. No. 08/188623 "Method of Transmitting Signals in an Extendible Local Area Hub Network," although the invention is not restricted in scope in this respect. Thus, as illustrated, hub station segment 100 includes a physical layer interface 900. The physical layer interface, as described in the aforementioned *Demand Priority Access* document, may perform a variety of functions, such as transmitting and receiving a signaling protocol between the remote stations and the hub station segment, while directing to a receiver 600 or obtaining from a transmitter 700 the electrical signal packets containing the data or information to be transmitted in the form of electrical signals. Likewise, physical layer interface 900 may also handle various aspects of transmitting signals to the remote stations, such as performing the signaling protocol. Thus, when one or more remote stations signals a request to transmit information, physical layer interface 900 provides a local request signal over one of the N local request lines 650 coupling physical layer interface 900 to a round robin (RR) controller, such as round robin controller 550, as explained in more detail in the aforementioned *Demand Priority Access* document. Round robin controller 550 in this particular embodiment comprises a master round robin controller and operates substantially in accordance with the state diagram illustrated in FIG. 6. Thus, based on the local remote station requests for this hub station segment, provided by physical layer interface 900, the requests of the other hub station segments in the hub station network, provided over bus 55, as explained in more detail hereinafter, and the last or most recent hub station segment to have control of round robin polling over the hub station network, master round robin controller 550 may determine which segment to grant control of round robin polling over the hub station network. If control of round robin polling is granted to this particular segment, that grant is signaled to physical layer interface 900 over one of the N grant lines 660, such as illustrated in FIG. 5. Physical layer interface 900 then signals the remote stations to begin transmitting electrical signal packets until round robin polling of the local remote stations is complete. If control is granted to another hub station segment, that grant is signaled over bus 55, as explained in more detail hereinafter. The slave round robin controller for that hub station segment then begins its local round robin polling.

Figure 6:
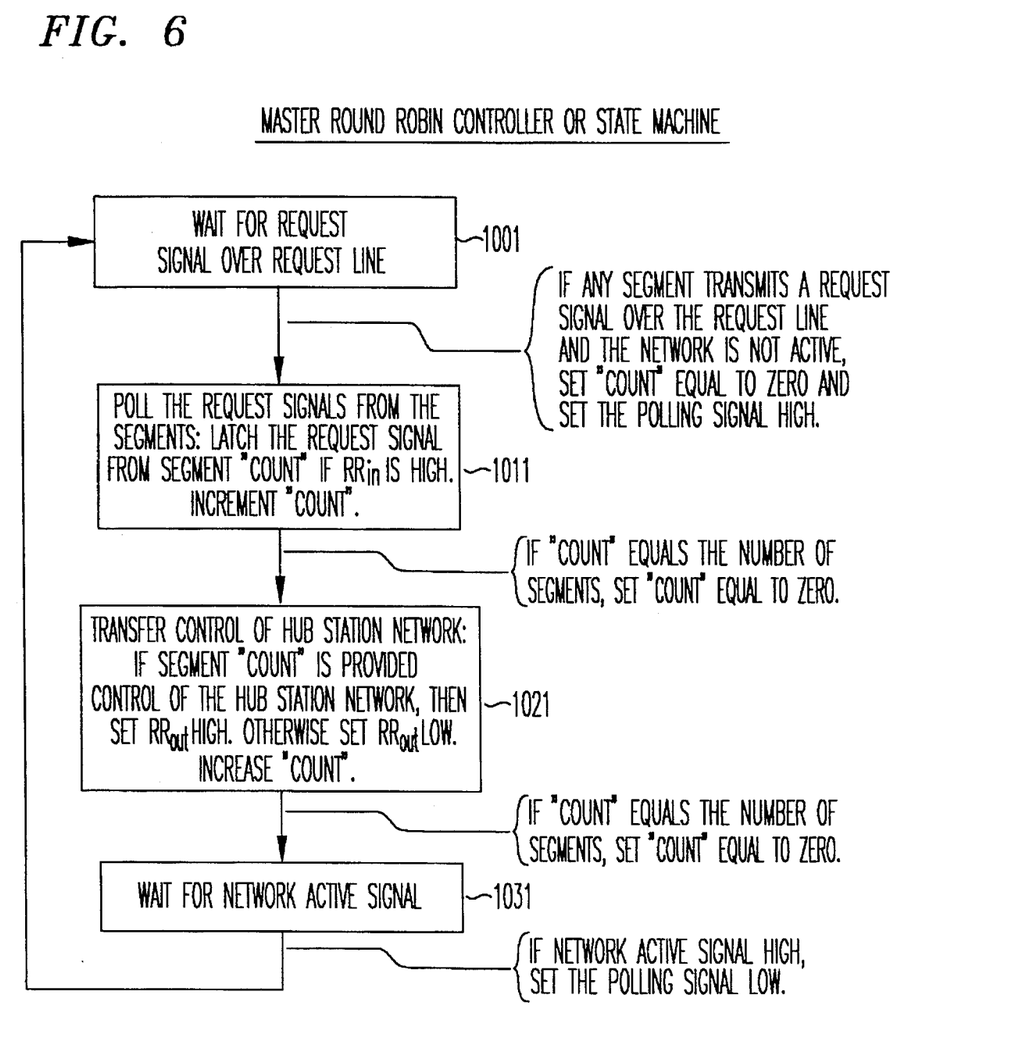
FIGS. 6 and 7 are, respectively, state diagrams for master and slave round robin controllers for hub station segments in an embodiment of a hub station network for an extendible, round robin, local area hub network in accordance with the invention, such as the embodiment illustrated in FIG. 5.
Figure 7:
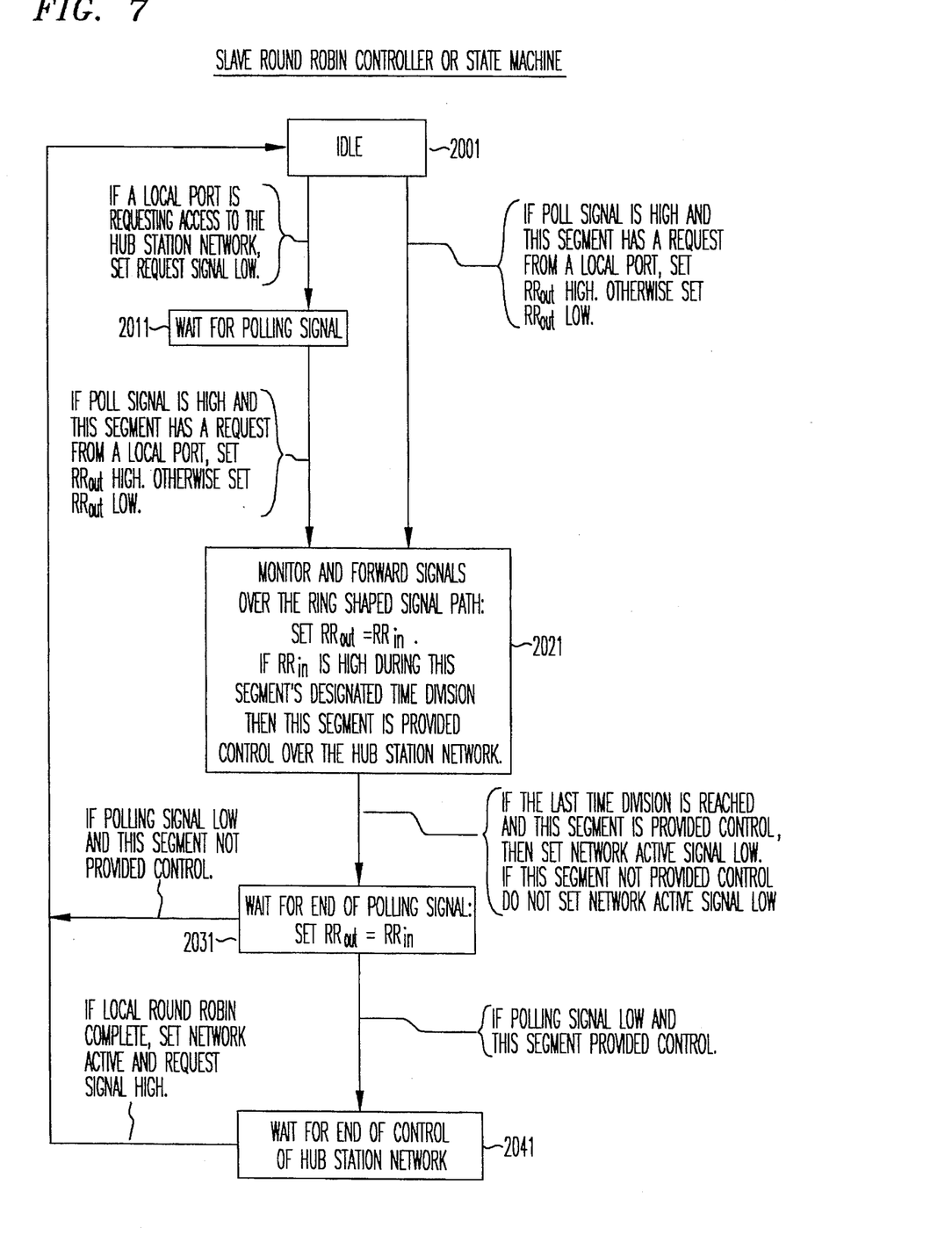

FIGS. 6 and 7 are, respectively, state diagrams for master and slave round robin controllers for hub station segments in an embodiment of a hub station network for an extendible, round robin, local area hub network in accordance with the invention, such as the embodiment illustrated in FIG. 5. Each state block of the respective state diagrams represents events that occur within that state. Likewise, the paths between states or state blocks indicate events that result in a transition from one state to the next successive state and, likewise, events that may take place when a transition to the next state occurs. Thus, the transitions and actions or events internal to a state indicated are triggered by clock pulses or other timing signals. As illustrated in FIG. 6, for this particular embodiment of a master round robin controller, state 1001 comprises waiting for a request signal. A transition to state 1011 occurs when a hub station segment transmits a request signal and the hub station network is not active, i.e., the network active signal is high in this particular embodiment. Likewise, on this particular transition, the polling signal is set high by the master round robin controller. This signals the other hub station segments to provide a request signal over the ring-shaped segment signal path. In state 1011, the master round robin controller thus polls the request signals from the hub station segments in the hub station network. As indicated in this particular embodiment, an internal counter, termed "count" in this embodiment, is set to zero on the transition and incremented on each successive clock pulse in state 1011. As "count" is incremented, the master round robin controller may latch the request signal provided that the signal provided over the ring-shaped signal path to $RR_{in}$ of the master hub station segment is high. This accomplishes the polling previously described. After "count" has incremented through the hub station segments in the hub station network, a transition to state 1021 occurs and "count" is reset. As previously described, the master round robin controller may include internal logic to determine, based on, for example, the request signals received, the last segment to receive control of round robin polling over the hub station network, and other hub station network system considerations, which hub station segment shall be granted or provided control of round robin polling over the hub station network. As "count" advances, such as based on the system clock, a signal is provided over the ring-shaped segment signal path via $RR_{out}$ of the master hub station segment by the master round robin controller to signal the transfer of control. Thus, $RR_{out}$ is set low except when "count" corresponds to the hub station segment to obtain control of round robin polling over the hub station network. This ensures that the signal is transmitted during the appropriate time division corresponding to the selected hub station segment. After "count" has again increment through the hub station segments, a transition to state 1031 occurs. In state 1031, the master round robin controller waits for a network active signal. Once this signal is received, the polling signal is set low and the master round robin controller returns to state 1001. It will, of course, be appreciated that the invention is not restricted in scope to any particular convention with respect to the digital signals being communicated, such as employing a "high" or "low" setting.

Progression through the slave round robin controller state diagram in FIG. 7 is based on clock pulses of successive timing signals, like the master round robin controller state diagram. A transition may occur from idle state 2001, either if a local port for the particular slave hub station segment requests access to the hub station network, or if a polling signal is received from the master hub station segment network. In the former case, a transition to state 2011 occurs, whereas in the latter case a transition to state 2021 occurs. If state 2011 is reached, then the slave round robin controller waits for a polling signal. Therefore, as illustrated in FIG. 7, eventually, a transition to state 2021 should occur. Likewise, if this particular hub station segment has a request from a local port, then the slave round robin controller provides a signal on the ting-shaped segment signal path via $RR_{out}$ of the slave hub station segment. This provides information to the master hub station segment regarding which hub station segments are requesting control of round robin polling or access to the hub station network. Due to the timing around the ting-shaped segment signal path, the master hub station segment receives a signal from each slave hub station segment in a different time division or time slot. Likewise, as previously described, the master hub station segment provides a signal over the ting-shaped segment signal path indicating the hub station segment to obtain control of round robin polling over the hub station network. Each slave hub station segment forwards that signal to the next slave hub station segment but also monitors the signal to determine if it shall be the next hub station segment to have access to, or control over, the hub station network. Likewise, as indicated by remaining states 2031 and 2041, if this particular hub station segment obtains control of round robin polling over the hub station network, then it sets the network active signal low and utilizes the hub station network, such as described in aforementioned U.S. patent application Ser. No. 08/188, 623. Otherwise, at the end of the polling signal, this hub station segment returns to idle state 2001. Likewise, if this particular hub station segment does obtain control of round robin polling over the hub station network, after it has completed its local round robin, it returns to idle state 2001 and sets both the network active signal and the request signal high so that the master hub station segment may transfer control of round robin polling to another hub station segment.

Typically, the hub station segments may be implemented by integrated circuit chips, although the invention is not restricted in scope in this particular manner. Integrated circuit chips offer the convenience of a relatively small size device at a relatively moderate cost. As previously suggested, more than one hub station segment is employed in those situations that require communication between a relative large number of remote stations for a single hub station due to limitations on the number of ports for a single integrated circuit chip. Nonetheless, alternatively, these hub station network components may be implemented with alternative technologies other than integrated circuitry, such as, for example, discrete electrical circuit components or logic gates. Furthermore, hub station segments need not be restricted to implementation on a single integrated circuit chip. The invention is also not restricted in terms of the type of couplings employed to mutually connect or couple the hub station segments; however, typically interconnections such as, for example, electrically conductive wires, optical fibers, or coaxial cable connections are employed.

As explained in greater detail in the aforementioned U.S. patent application Ser. No. 08/188,623, entitled, "Method of Transmitting Signals in an Extendible Local Area Hub Network," each of the hub station segments may include at least two ports and each of the ports are adapted to receive electrical signal packets from a remote station directly coupled to the hub station segment. Thus, once a particular hub station segment obtains control of round robin polling over the hub station network, it polls the local remote stations directly coupled to that hub station segment for electrical signal packets from the directly coupled remote stations and then transmits or forwards those electrical signal packets to the hub station segments in the hub station network directly coupled to the destination remote station for the electrical signal packets being transmitted.

As explained in more detail hereinafter, the embodiment of a portion of a hub station network illustrated in FIG. 1 offers a convenient structure for polling hub station segments in a hub station network of an extendible, round robin, local area hub network. Advantages associated with the use of such a structure, in accordance with the method described hereinafter, include: simplicity and ease of network expansion; reducing the delays at each hub station segment such as are typically associated with "token" passing in a "token-passing" ring network; reducing other problems associated with distributed network control, such as control anomalies that may occur from "missing" or "multiple" tokens, by employing a master hub station segment or central controller; and low pin count or port overhead through the use of a ring-shaped segment signal path that reduces the number of individual signal lines.

A hub station or hub station network for an extendible, local area hub network, such as illustrated in FIG. 1, may be operated to perform round robin polling of hub station segments in accordance with the following method: a request for control of round robin polling over the hub station network is signaled from at least one of the hub station segments, such as segments 200 and 300, to the master hub station segment, such as segment 100 in FIG. 1. This may be accomplished for the embodiment illustrated in FIG. 1 by one of the hub station segments "pulling down" on request coupling 70. Thus, round robin master hub station segment 100 receives signals regarding requests for control of round robin polling over the hub station network from the other hub station segments via bus 55.

Figure 2:
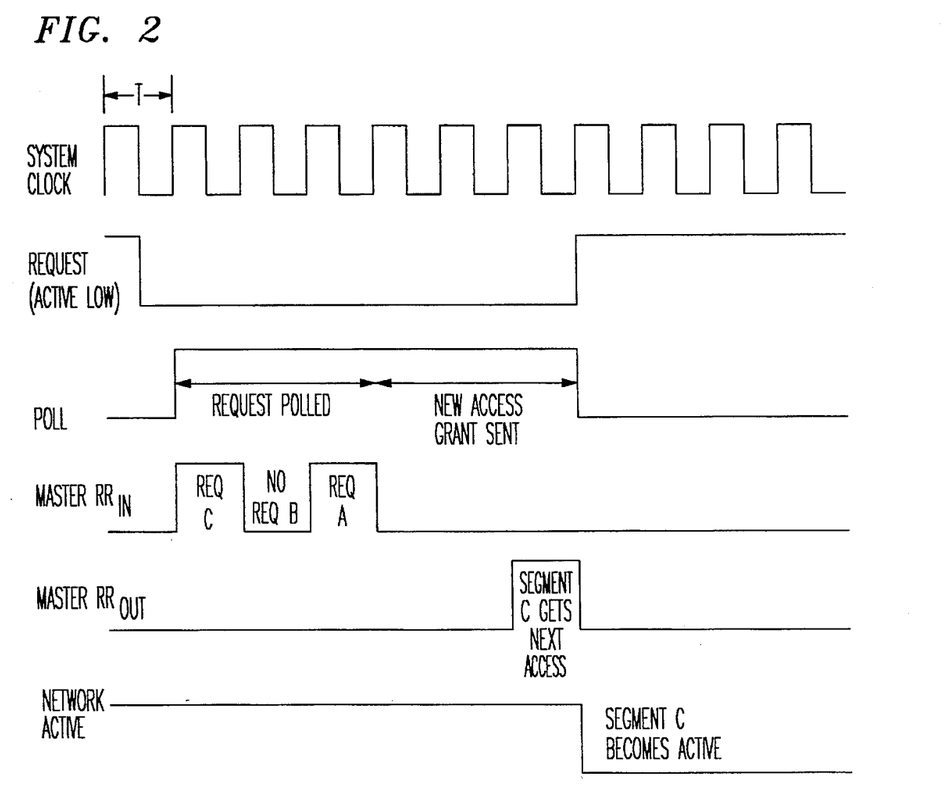
FIG. 2 is a timing diagram illustrating the relationship of various electrical signals that may be employed, for example, by the embodiment of a hub station network for an extendible, round robin, local area hub network in accordance with the invention, such as illustrated in FIG. 1.

As illustrated in FIG. 2, the hub station segments are driven by a clock pulse of period T that synchronizes the timing of the electrical signals transmitted over bus 55 and the electrical signals along the ting-shaped segment signal path. As previously described, this may alternatively be accomplished by one or more externally-derived clocks or timing signal sources. The temporal relationship of this clock pulse to other electrical signals in hub station network 500 is further illustrated in FIG. 2.

Master hub station segment 100 then transmits a signal to all of the other hub station segments, or all of the hub station segments, for a request status signal. This may be accomplished by setting poll coupling 80 of bus 55 high, likewise illustrated in FIG. 2. Nonetheless, it will be appreciated that the invention is not restricted in scope to any particular convention with respect to the digital signals being communicated, such as employing a "high" or "low" setting. This polling signal enables master hub station segment 100 to obtain information regarding those hub station segments requesting control of the hub station network or control of round robin polling over the hub station network.

The electrical signal transmitted from master hub station segment 100 via coupling 80 signals the hub station segments to transmit a signal providing the request status of the particular hub station segment to the master hub station segment over the ting-shaped segment signal path of the hub station network. Therefore, each of the other hub station segments, or alternatively each segment, may transmit a request status signal during a substantially predetermined time division or time slot for the hub station segment different from the time slot of any other of the hub station segments, such as illustrated in HG. 2. Likewise, intervening hub station segments along the ring-shaped segment signal path further transmit request status signals to the next successive hub station segment in the ting-shaped segment signal path. It will now be appreciated that the number of time divisions or slots will depend at least in part on the number of hub station segments. When receiving the signals in the respective time slots, such as illustrated in FIG. 2, the master hub station segment is able to determine those hub station segments requesting control of round robin polling over the hub station network. Although FIG. 2 illustrates hub station segment 100 as transmitting a request status signal, typically such signaling shall be handled internal to hub station segment 100 rather than by transmission over bus 55.

The master hub station segment stores, typically as a state, the last or most recent hub station segment to have control of the hub station network or control of round robin polling over the hub station network. Therefore, based on the signals providing the request status of the hub station segments transmitted over the ring-shaped segment signal path, and based on the state of the round robin controller corresponding to the last hub station segment to have control over the network, the master hub station segment transmits a signal over ring-shaped segment signal path 50 to the other hub station segments, or to all of the hub stations segments, indicating which hub station segment is now provided or transferred control of round robin polling over the hub station network. This is illustrated in FIG. 2 in which hub station segment 300 is provided with control or control is transferred to hub station segment 300. It will be appreciated, of course, that this is intended only as an example and that the position accorded the hub station segments in the round robin relative to the other hub station segments will depend on the particular embodiment. Likewise, each of the other hub station segments monitors a particular time slot or division different from the time division or slot of the other segments. Thus, after the master hub station segment determines, based on the state of its internal state machine or round robin controller, the hub station segment to have control over the hub station network, it transmits a signal to the other hub station segments over the ring-shaped segment signal path during the time division corresponding to the hub station selected. It will now be appreciated that each hub station segment in the ring-shaped segment signal path further transmits the signal provided by the master hub station segment along the ring-shaped segment signal path to the next successive hub station segment. Therefore, the master hub station segment determines which hub station segment to provide with control based on a predetermined relative polling position of the hub station segments and the last segment provided control. In summary, the master hub station segment transmits a signal providing control to the requesting hub station segment which has the closest polling position after the polling position of the last hub station segment which had control. The master hub station segment accomplishes this signaling by transmitting, during the time slot of the hub station segment having the closest polling position, a signal providing or transferring control to that hub station segment.

The hub station segment obtaining control over the network then transmits a network active signal via bus 55 to indicate to the remaining hub station segments that the network is active. The hub station segment may transmit this network active signal continually during the period for which it conducts round robin polling of the local remote stations directly coupled to it. After a limited time period during which the particular hub station segment has conducted local round robin polling of the directly coupled remote stations and transmitted electrical signal packets from the directly coupled local remote stations, as described in aforementioned U.S. patent application Ser. No. 08/188, 623, the master hub station segment again monitors the hub station segment requests based on request coupling or line 70, as described previously. If no hub station segments request control, then polling by the master hub station segment is idle until a hub station segment "pulls" on the request coupling. However, if there are one or multiple requests pending over request coupling 70, in which case the request line in this particular embodiment may be continuously "pulled" low, then the master hub station segment begins polling, as previously described, when the hub station segment having control of the hub station network releases the hub station network, indicated by no longer transmitting a network active signal over coupling 60 of bus 55.

The technique previously described may also be extended to nest two round robin polling priority levels, if desired. One technique to accomplish this would be to add another request coupling to bus 55 in addition to coupling 70. Thus, the two request lines would have two different priorities so that if the higher priority request line received a signal, it would result in an interruption of round robin polling over the network and in a transfer of control of round robin polling over the hub station network to the hub station segment making the request, such as previously described. After the higher priority transmission has been completed, control may then be returned to the hub station segment interrupted during round robin polling. By this technique, any number of levels of priority nesting may be accommodated. Another method would be to extend the number of time slots or divisions for the signals transmitted over the ring-shaped segment signal path so that hub station segments may transmit a high and a low priority request in different time slots.

Any time delay associated with transmitting signals between hub station segments over the ring-shaped segment signal path, such as previously described, should not introduce significant delays in electrical signal packet transmission over the hub station network because the time for this signaling is relatively small in comparison with the time delay between transmitting electrical signal packets using the protocol described in the aforementioned *Demand Priority Access* document. Thus, in situations where the hub station network is heavily utilized, this signaling may take place between electrical signal packets. Where the activity over the hub station network is low, this signaling may have a greater impact in terms of additional delay, although the effect is again not critical because the hub station network activity is low.

While only certain features of the invention have been illustrated and described herein, many modifications, substitutions, changes or equivalents will now occur to these skilled in the art. It is therefore, to be understood, that the appended claims are intended to cover all such modifications and changes as fall within the true spirit of the invention.

I claim:

1. An extendible, round robin, local area hub station network, said network comprising:

a round robin hub station including at least two round robin hub station segments coupled so as to form a ring-shaped hub station segment signal path;

one of said at least two hub station segments comprising a master hub station segment adapted to provide control signals on said ring-shaped segment signal path to transfer control of round robin polling over said hub station network between any two of said at least two hub station segments in said ring-shaped segment signal path;

said at least two hub station segments being mutually coupled by a signal bus.

2. The network of claim 1, and further comprising at least one other round robin hub station segment in said ring-shaped segment signal path and coupled to said signal bus in addition to said at least two hub station segments.

3. The network of claim 1, wherein said signal bus comprises three couplings, the first coupling being adapted to provide a request signal from at least one of said at least two hub station segments in said ring-shaped segment signal path to said master hub station segment;

the second coupling being adapted to provide a polling signal from said master hub station segment to the at least one of said at least two hub station segments in said ring-shaped segment signal path; and the third coupling being adapted to provide a network active signal from the at least one of said at least two hub station segments in said ring-shaped segment signal path to said master hub station segment.

4. The network of claim 3, and further comprising at least one other round robin hub station segment in said ring-shaped segment signal path and coupled to said signal bus in addition to said at least two hub station segments;

wherein said first coupling is further adapted to provide a request signal from at least each of said other hub station segments in said ring-shaped segment signal path to said master hub station segment.

5. The network of claim 4, wherein said second coupling is further adapted to provide a polling signal from said master hub station segment to at least each of said other hub station segments in said ring-shaped segment signal path.

6. The network of claim 5, wherein said third coupling is further adapted to provide a network active signal from at least each of said other hub station segments in said ring-shaped segment signal path to said master hub station segment.

7. The network of claim 1, wherein each of said at least two hub station segments comprises an integrated circuit.

8. The network of claim 1, wherein each of said at least two hub station segments includes at least two ports, each of said ports being adapted to receive signal packets from a remote station directly coupled to the hub station segment.

9. The network of claim 3, wherein said couplings comprise couplings selected from the group consisting essentially of optical fibers, metal interconnections, and coaxial cable connections.

10. An integrated circuit adapted for use in an extendible, round robin, local area hub station network, said network comprising:

a round robin hub station including at least two round robin hub station segments coupled so as to form a ring-shaped hub station segment signal path;

one of said at least two hub station segments comprising a master hub station segment adapted to provide control signals on said ring-shaped segment signal path to transfer control of round robin polling over said hub station network between any two of said at least two hub station segments in said ring-shaped segment signal path;

said at least two hub station segments being mutually coupled by a signal bus.

11. A method of round robin polling in an extendible, round robin, local area hub station network;

said hub station network comprising at least one round robin hub station including at least two round robin hub station segments coupled so as to form a ring-shaped hub station segment signal path;

one of said at least two hub station segments comprising a master hub station segment adapted to provide control signals on said signal path;

said hub station segments being mutually coupled by a signal bus;

said method comprising the steps of:

signaling a request for control of round robin polling over said hub station network from at least one of said at least two hub station segments to said master hub station segment; and transmitting from said master hub station segment a signal transferring control of round robin polling over said hub station network between any two of said at least two hub station segments.

12. The method of claim 11, wherein said hub station network further comprises at least one other round robin hub station segment in said ring-shaped segment signal path and coupled to said signal bus in addition to said at least two hub station segments;

and further comprising, after the signaling step, the step of polling at least the two other hub station segments for any request for control of round robin polling over said hub station network.

13. The method of 12, wherein the step of signaling a request for control of round robin polling over said hub station network comprises transmitting a signal from any one of said at least the two other hub station segments to said master station segment over said signal bus.

14. The method of claim 13, wherein the step of polling comprises the steps of:

transmitting a signal from said master hub station segment to said at least the two other hub station segments for a request status signal; and transmitting over said ring-shaped hub station segment signal path from said at least the two other hub station segments to said master hub station segment a request status signal for the hub station segment.

15. The method of claim 14, wherein the step of transmitting a request status signal from said at least the two other hub station segments comprises transmitting a request status signal for each of said at least the two other hub station segments during a substantially predetermined time division different from the substantially predetermined time division of any other of said at least the two other hub station segments.

16. The method of claim 15, wherein one of said hub station segments constitutes the hub station segment most recently having control of round robin polling over said hub station network;

each of said hub station segments having a predetermined round robin polling position relative to the remaining hub station segments in said hub station network;

wherein the step of transmitting a signal providing control of round robin polling over said hub station network comprises transmitting the signal providing control to the hub station segment, among those hub station segments requesting control of said at least the two other hub station segments, having the closest polling position relative to and after said hub station segment most recently having control.

17. The method of claim 16, wherein the signal providing control is transmitted during the time division of said hub station segment having the closest polling position relative to and after said hub station segment most recently having control.

18. The method of claim 11, and further comprising, after transmitting from said master hub station segment a signal transferring control of round robin polling over said hub station network between any two of said at least two hub station segments, the step of transmitting a network active signal via said signal bus from the at least one of said at least two hub station segments to at least said master hub station segment.

19. The method of claim 18, wherein the at least one of said at least two hub station segments obtains control of round robin polling over said hub station network for a limited duration;

the step of transmitting a network active signal comprises transmitting the network active signal substantially only during the limited duration.

20. The method of claim 18, and further comprising at least one other round robin hub station segment in said ring-shaped signal path and coupled to said signal bus in addition said at least two hub station segments;

the step of transmitting a network active signal comprising transmitting a network active signal via said signal bus from the at least one of said at least two hub station segments to at least any other hub station segments.

* * * * *